(12) United States Patent
Miguel Sánchez et al.

(10) Patent No.: US 12,320,699 B2
(45) Date of Patent: Jun. 3, 2025

(54) DETECTOR WAVELENGTH CALIBRATION

(71) Applicant: ams Sensors Singapore Pte. Ltd., Singapore (SG)

(72) Inventors: Javier Miguel Sánchez, Zurich (CH); Kotaro Ishizaki, Zurich (CH); Peter Roentgen, Thalwil (CH); Francesco Paolo D'Aleo, Samstagern (CH)

(73) Assignee: AMS SENSORS SINGAPORE PTE. LTD., Singapore (SG)

( * ) Notice: Subject to any disclaimer, the term of this patent is extended or adjusted under 35 U.S.C. 154(b) by 236 days.

(21) Appl. No.: 17/785,744

(22) PCT Filed: Dec. 9, 2020

(86) PCT No.: PCT/SG2020/050729
§ 371 (c)(1),
(2) Date: Jun. 15, 2022

(87) PCT Pub. No.: WO2021/126077
PCT Pub. Date: Jun. 24, 2021

(65) Prior Publication Data
US 2023/0052878 A1 Feb. 16, 2023

Related U.S. Application Data

(60) Provisional application No. 62/950,195, filed on Dec. 19, 2019.

(51) Int. Cl.
*G01N 21/17* (2006.01)
*G01J 3/02* (2006.01)
(Continued)

(52) U.S. Cl.
CPC .............. *G01J 3/0297* (2013.01); *G01J 3/10* (2013.01); *G01J 3/30* (2013.01);
(Continued)

(58) Field of Classification Search
CPC .... G01J 3/0297; G01J 3/10; G01J 3/30; G01J 2003/2859; G01J 2003/2866;
(Continued)

(56) References Cited

U.S. PATENT DOCUMENTS 5,303,165 A * 4/1994 Ganz .................. G01J 3/28
356/325
5,835,216 A * 11/1998 Koskinen ............. G01N 21/314
356/519

(Continued)

FOREIGN PATENT DOCUMENTS

DE 102010056137 A1 * 6/2012 .......... G01N 21/276
EP 0560006 A2 9/1993
(Continued)

OTHER PUBLICATIONS https://www.vision-doctor.com/en/interference-filters.html (Year: 2017).*
(Continued)

*Primary Examiner* — Michelle M Iacoletti
*Assistant Examiner* — Judy Dao Tran
(74) *Attorney, Agent, or Firm* — MH2 Technology Law Group LLP

(57) ABSTRACT

A method of calibrating a driving parameter of an optical component across an operating wavelength range of the component. The method comprises placing a layer of material in a light path, the layer of material being substantially planar and substantially transparent and having a thickness of the order of wavelengths in said range and operating said component to vary said driving parameter whilst detecting light transmitted through said layer of material to obtain driving parameter versus light intensity data. The obtained data is then compared with characterizing data previously derived for said layer of material in order to calibrate said driving parameter.

18 Claims, 3 Drawing Sheets

(51) Int. Cl.
  *G01J 3/10* (2006.01)
  *G01J 3/30* (2006.01)
  *G01J 3/28* (2006.01)
  *G01N 21/27* (2006.01)

(52) U.S. Cl.
  CPC ............. *G01J 2003/2859* (2013.01); *G01J 2003/2866* (2013.01); *G01N 21/274* (2013.01)

(58) Field of Classification Search
  CPC .. G01J 3/0286; G01J 3/021; G01J 3/26; G01J 3/28; G01N 21/274
  See application file for complete search history.

(56) References Cited

U.S. PATENT DOCUMENTS

| 2005/0134861 | A1 | 6/2005 | Kringlebotn et al. | |
| 2005/0213092 | A1* | 9/2005 | MacKinnon | G01N 21/31 356/336 |
| 2018/0003558 | A1* | 1/2018 | Goldring | G01J 3/0297 |
| 2019/0011313 | A1* | 1/2019 | Goldring | G01J 3/0286 |
| 2020/0056939 | A1* | 2/2020 | Ishizaki | G01J 3/28 |

FOREIGN PATENT DOCUMENTS

| KR | 20190021563 A | 3/2019 | |
| WO | WO-0062025 A1 * | 10/2000 | ............... G01J 3/28 |

OTHER PUBLICATIONS

Haller, Mirjam (EP Authorized Officer), International Search Report and Written Opinion in corresponding International Application No. PCT/SG2020/050729 mailed on Mar. 25, 2021, 12 pages.
Ebermann et al., "Aufbau und Betrieb eines Infrarot-Mikrospektrometers auf der Basis eines MEMS-FP-Filter".
Korean Notice of Preliminary Rejection dated Jan. 21, 2025 issued in corresponding Korean Patent Application No. 10-2022-7024713, with English translation, 10 pages.
Peng Le (Examiner); Chinese Office Action issued in corresponding Chinese Patent Application No. 202080087044.6, dated Mar. 26, 2025, with English translation, 18 pages.

* cited by examiner

DETECTOR WAVELENGTH CALIBRATION

CROSS-REFERENCE TO RELATED APPLICATIONS

The present application is the national stage entry of International Patent Application No. PCT/SG2020/050729, filed on Dec. 9, 2020, and published as WO 2021/126077 A1 on Jun. 24, 2021, which claims the benefit of U.S. Provisional Patent Application No. 62/950,195, filed on Dec. 19, 2019, all of which are incorporated by reference herein in their entireties.

TECHNICAL FIELD OF THE DISCLOSURE

The present disclosure relates to detector wavelength calibration and in particular, though not necessarily, to spectrometer wavelength calibration.

BACKGROUND

An optical spectrometer is an instrument used to measure properties of light over a specific portion of the electromagnetic spectrum. The variable measured is sometimes the light's intensity, with the independent variable being the wavelength of the light. Some spectrometers measure spectral regions in or near the visible part of the electromagnetic spectrum, although some spectrometers also may be able to measure other wavelengths, such as the infra-red (IR) or ultraviolet (UV) parts of the spectrum.

In reflectance spectrometers, the spectrometer measures the fraction of light reflected from a surface as a function of wavelength. Reflectance measurements can be used to determine, for example, the color of a sample, or examine differences between objects for sorting or quality control. Reflectance measurements can also be used to identify particular materials, as illuminating different materials will result in different reflection profiles.

In some instances, spectrometers are manufactured as small, compact modules that contain the required optoelectronic components (e.g., light source and optical sensor) in a housing under a cover glass. Light produced by the light source is emitted from the module toward a sample under test. Light reflected by the sample under test is detected by the sensor.

Manufacturing processes for the spectrometer modules may result in variations in fabrication, tolerances, and variability of the multiple components of the system. Such variations can result in unintended variations from one module to the next, e.g. the reflection spectrum for a given sample and a given spectrometer module may appear shifted in wavelength compared to that for the same sample and a different spectrometer module. It is therefore usually necessary to perform a calibration of individual modules before they leave the factory, or possibly at a later stage but prior to using it to measure the reflectivity of unknown samples.

Optical spectrometers may employ silicon micro electromechanical systems (MEMs) technology, and in particular MEMs employing a tunable Fabry-Perot interferometer (FPI). These devices are referred to here as "spectral sensors". MEMS based-FPIs typically include a vertically integrated structure composed of two mirrors separated by an air gap. Wavelength tuning is achieved by applying a voltage between the two mirrors, which results in an electrostatic force, which pulls the mirrors closer to one another. Calibration of such an optical spectrometer may involve directing narrowband light onto a detector of the spectrometer and varying the control voltage to determine the voltage at which the detector output is a maximum. Calibrated crosstalk and dark noise configuration values may then be determined. A full calibration record is then determined using this data and measuring the system response with a reference material having a known reflectivity response. The full calibration record is stored in memory coupled to the spectrometer. In some cases, these operations must be repeated to calibrate the sensor across a range of temperatures, e.g. using a climatic chamber.

Calibration may be performed using, for example, selective light sources such as sunlight, Hg—Ar, etc., gas discharge emission lamps, lasers. Alternatively, broadband light sources may be used in combination with selective filters such as monochromators, Fabry-Pèrot Filters, laser frequency combs, and gas absorption cells. The object of these arrangements is to provide well-defined wavelengths to the system and correct the response of the spectrometer according to the provided shift.

The calibration of spectral sensors is a non-negligible part of the cost of producing sensors. In particular, the calibration of MEMS-based spectrometer sensors requires the measurement of various spectra at all points of operation, and recording of the corresponding look-up-table of driving voltage versus transmission wavelength into memory. Whilst this has not been a significant issue in the case of low volume production of essentially laboratory instrumentation, it does represent a barrier to the mass production of spectral sensors such as is now desirable, e.g. where such sensors are greatly miniaturized for deployment in consumer electronic devices such a smartphones.

The light sources currently used for calibration, some of which have been identified above, are not well suited to use in mass production processes. Furthermore, they are not well suited to provide low cost and simple to use calibration solutions such as would be required where a device end user desires to calibrate or re-calibrate a spectrometer of the device in a typical commercial or domestic environment. Consider for example a smartphone device incorporating a spectrometer such as might be used by the device to detect that nature (e.g. fabric, plastic, metal etc) of a material presented to the device.

The smartphone device owner may be required to perform an initial calibration of the spectrometer following unboxing of the device, or may be required to perform a recalibration to account for drift occurring since a factory calibration. Such a user cannot be expected to have access to a laser light source or gas absorption cell.

SUMMARY

According to a first aspect of the present invention there is provided a method of calibrating a driving parameter of an optical component across an operating wavelength range of the component. The method comprises placing a layer of material in a light path, the layer of material being substantially planar and substantially transparent and having a thickness of the order of wavelengths in said range and operating said component to vary said driving parameter whilst detecting light transmitted through said layer of material to obtain driving parameter versus light intensity data. The obtained data is then compared with characterizing data previously derived for said layer of material in order to calibrate said driving parameter.

The step of comparing may comprise aligning one or more features of the obtained data with one or more features of the characterizing data in order to calibrate the driving parameter.

The thickness of said layer of material may between 1 and 20 times the maximum wavelength of the operating wavelength range of the optical component, preferably 1 to 10. The material may be plastic.

The step of calibrating said driving parameter may comprise creating a look-up table mapping the driving parameter to wavelength.

The optical component may be a spectrometer, wherein said layer of material is interposed between a light source and the spectrometer, the method comprising operating said spectrometer to vary said driving parameter whilst detecting light transmitted through said layer of material to obtain driving parameter versus light intensity data. The method may comprise disposing a reflector in the light path to reflect light from the light source to the spectrometer via the layer of material. The method may further comprise obtaining a system response by operating the spectrometer in the absence of the layer of material, and using that response to correct the detected light or calibration process. The step of obtaining a system response may comprise detecting light from said light source or from a further light source.

The optical component may be a tunable light source, and said layer of material may be disposed between said spectrometer and a light source.

According to a second aspect of the present invention there is provided a device comprising an optical component which is operable by means of a driving parameter across an operating wavelength range. The device comprises a layer of material that is movably disposable in an optical path and that is substantially planar and substantially transparent and has a thickness of the order of wavelengths in said range. The device is configured to operate said component to vary said driving parameter whilst detecting light transmitted through said layer of material to obtain driving parameter versus light intensity data, and compare the obtained data with characterizing data previously derived for said layer of material in order to calibrate said driving parameter.

The optical component may be a spectrometer, wherein said layer of material is slidably disposed in front of said spectrometer. The device may comprise a light source, and may be provided in combination with a light reflector for re-directing light from said light source to said spectrometer.

DETAILED DESCRIPTION

The introduction of mass produced spectrometers, such as those for use in consumer products, is creating a demand for low cost and easy to use spectrometer calibration procedures. Ideally, a procedure should have a cost that represents a fraction of the cost of the spectrometers and devices and that can be performed by an unskilled user. The procedure and system that is described here is intended to meet this need.

It is proposed here to implement, according to at least certain embodiments, a procedure that utilizes, at a minimum, a white light source and a thin material layer that is substantially transparent. The light source may be, for example, daylight or commonly used internal lighting. The thin material layer may be of plastic, glass, silicon etc, and preferably is of a type that does not change its optical properties (e.g. as a result of oxidation) to any significant extent over time, or at least over the expected lifetime of the spectrometer to be calibrated or the device in which that spectrometer is used.

The thickness of the thin layer material is chosen to be comparable to wavelengths within the operating range of the spectrometer to be calibrated. For example, in the case of a spectrometer having an operating wavelength range of 1.3 μm to 2.15 μm, a thickness of 10 μm might be suitable. This will give rise to multiple reflections of light between the upper and lower reflecting surfaces of the layer which will in turn give rise to constructive and disruptive interference of light within the layer. The result is that light exiting the layer will contain intensity peaks at wavelengths that are integer multiples of the slab thickness.

Figure 1:
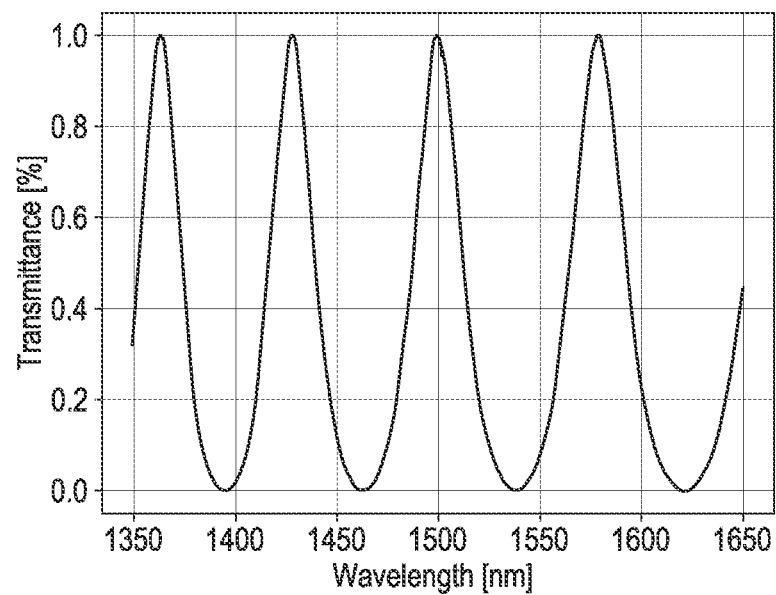
FIG. 1 illustrates light transmissibility for a thin layer of material.

FIG. 1 illustrates calculated transmissibility for a planar layer of material having a thickness d of 10 μm, refractive index n of 1.5, and upper and lower surface reflectances R of 9. This assumes an angle of incidence of light on the upper surface θ of 0. The phase difference δ between each successive transmitted pair is given by:

$$\delta = \frac{2\pi}{\lambda} 2n \cdot d \cdot \cos\theta \qquad (1)$$

The transmittance function of the slab is:

$$T = \frac{(1-R)^2}{1 - 2R \cdot \cos\delta + R^2} \qquad (2)$$

This will produce a well-defined transmittance function with valleys and peaks (FIG. 1) which can be used for wavelength calibration of a spectrometer. Whilst the valleys and peaks alone can be used to calibrate the spectrometer, e.g. by shifting values in a pre-populated (look-up) calibration table installed in a device at the time of manufacture), due to the known mathematical form, all points of the resulting (transmissivity) measurement can be used for the calibration procedure and not only the crest/valley positions.

Figure 2:
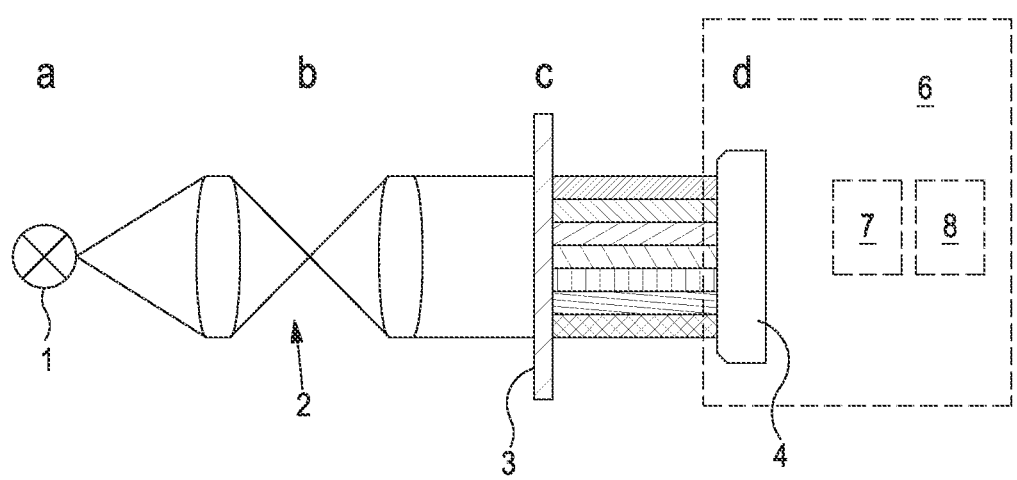
FIG. 2 illustrates a system including a device and a light source for calibrating a spectrometer of the light source.

FIG. 2 illustrates schematically how the technique may be used. The system comprises a broadband light source 1 that provides the electromagnetic wavelengths in the range of interest, a collimating system 2 (not strictly required for the invention per se, but needed in this specific case), the thin layer material slab 3, and the spectrometer 4 to be calibrated. The spectrometer may form part of a device 5 such as a smartphone. If the spectrometer is a MEMS-based Fabry-Pèrot spectrometer, it is necessary to accurately drive the control voltage, which in turn establishes the signal wavelength to measure. The thickness of the slab 3 is defined and chosen according to the operating wavelength range of the spectrometer 4.

Figure 3:
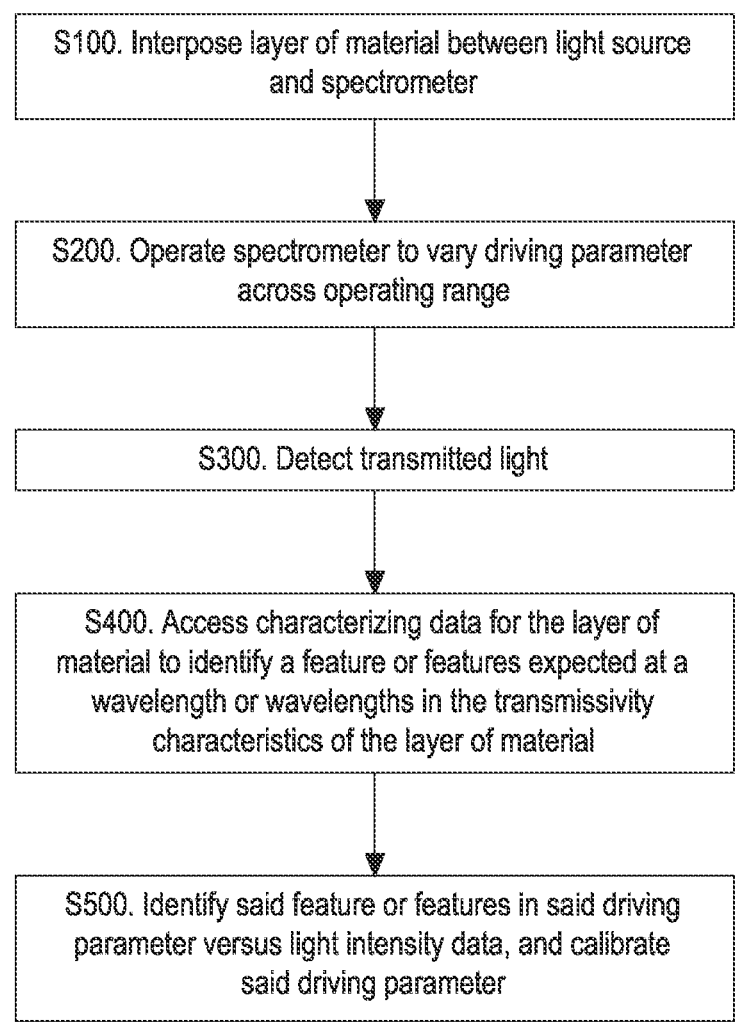
FIG. 3 is a flow diagram illustrating a method of calibrating a spectrometer.

The slab (or a substantially identical slab) will have been previously characterized such that its transmissibility characteristics are known (i.e. a profile such as is illustrated in FIG. 1 will have been obtained). The characteristics are pre-stored in a memory 7 of the device 6 (possibly being installed during manufacture of the device, or downloaded at a later stage). Once the spectrometer performs its scan, a transmittance curve is reproduced as an acquired spectrum. Since the behavior of light passing through the slab is well known, the correct response is mathematically established. In other words, the correct position of the whole spectrum is known (from the pre-stored data). The control voltage range can then be mapped to the wavelength range, e.g. by way of a voltage—wavelength look-up table stored to the memory 7. The device 6 includes a processor 8 for performing the calibration process (using, e.g. code stored in the memory 7). In an alternative arrangement, the spectrometer is pre-calibrated (using the thin slab) and a look-up table computed and stored in the memory 7, FIG. 3 is a flow diagram illustrating this approach and comprising:
S100. Interpose layer of material between light source and spectrometer.
S200. Operate spectrometer to vary driving parameter, e.g. control voltage, across the operating range.
S300. Detect transmitted light.
S400. Access characterizing data for the layer of material to identify a feature or features expected at a wavelength or wavelengths in the transmissivity characteristics of the layer of material.
S500. Identify said feature or features in said driving parameter versus light intensity data, and calibrate said driving parameter.

Spectrometers that can be calibrated using the above approach include sensors used for food analysis, colour sensing, infrared sensing, biomedical sensors, spectral sensing, counterfeiting, make-up analysis, medicine analysis, process control, thickness measurement, high temperature thermometry, LED measurement, reactive analysis, fluorescence analysis, etc.

Whilst the approach described above is in the context of a (miniature) spectrometer, it can be used to calibrate any appropriate light detector. It can also be used to calibrate tunable light sources (e.g. UV, visible or infrared).

The approach described here can be faster, cheaper and at least as precise as previously known approaches. No special light sources are required, no reference signal are used, and there is no need for exotic materials. The wavelength response achieved is very stable—only changes in material thickness and refractive index will cause drift. These can be extremely low. Temperature stability may also be good (only refractive index changes with temperature; thermal expansion produces negligible changes in dimensions). In the case of a spectrometer incorporated into a smartphone or other consumer device, the device may be provided together with a small layer of suitable material, e.g. plastic. Calibration may be performed during the initial setting-up of the device. The layer of material may even be incorporated into the device box, or may be provided over the sensor with instructions to peel it off after calibration is complete.

Figure 4:
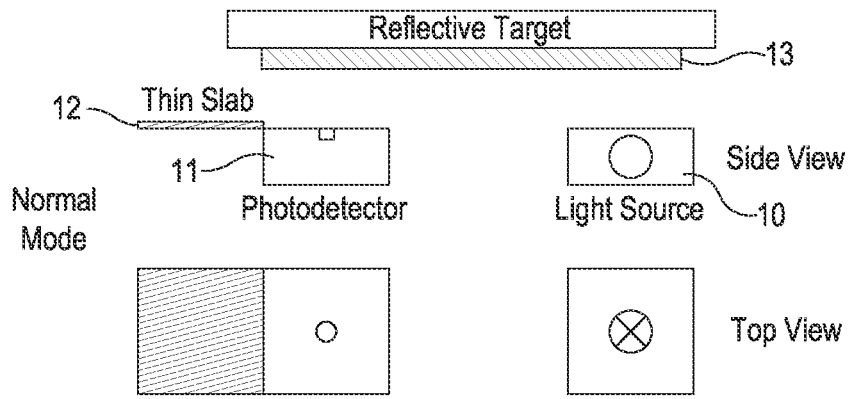
FIGS. 4 and 5 illustrates schematically a system for calibrating a spectrometer using a reflective target.
Figure 5:
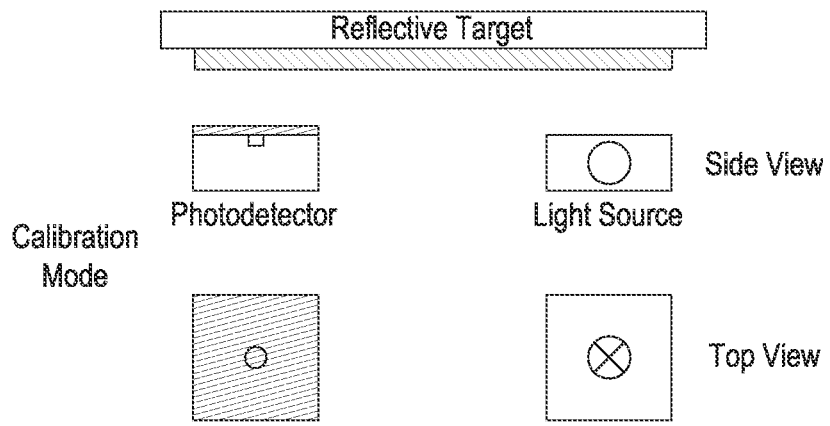

It will of course be appreciated by those of skill in the art that various modifications may be made to the above described embodiments without departing from the scope of the present invention. For example, FIG. 4 illustrates a device comprising integrated light source 10 and spectrometer (photodetector) 11. The layer of material 12 is in this case slidably disposed on the device to cover and uncover the spectrometer. A reflective target 13 is provided, e.g. as a component separate from the device, for disposing in front of the optical components to redirect light from the light source to the spectrometer. The reflective target 13 may be, for example, a layer of white reflective material. Whilst FIG. 4 shows the layer of material 12 slid out from in front of the spectrometer, e.g. a normal operating position, FIG. 5 shows the layer of material 12 slid in front of the spectrometer for the purpose of calibrating the spectrometer. The layer of material 12 may be slid by a manual operation of by some electromechanical system.

Figure 6:
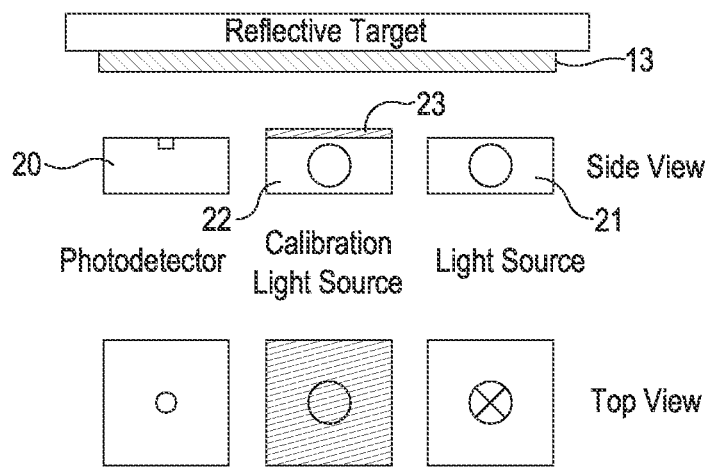
FIG. 6 illustrates schematically a system for calibrating a spectrometer using a reflective target and that takes account of a system response.

FIG. 6 shows a further alternative arrangement, where the device comprises a pair of light sources 21 and 22 in addition to the spectrometer 20. Only one of the light sources 22 has the thin layer of material 23 disposed over it in a non-sliding configuration. In this device, the light source 21 is used to obtain a system response for the spectrometer 20. A response is then obtained using the second light source 22 with the layer of material 23 disposed in the light path. The system response can be used to correct data obtained using the second light source 22.

What is claimed is:

1. A method of calibrating a driving parameter of an optical component across an operating wavelength range of the component, the method comprising:
placing a layer of material in a light path, the layer of material being substantially planar and substantially transparent and having a thickness of the order of wavelengths in said range, and having a known transmission profile with a plurality of transmission maximums and a plurality of transmission minimums over at least a portion of the operation wavelength range of the component;
operating said optical component to vary said driving parameter while detecting light transmitted through said layer of material in the light path provided by a tunable light source that produces light of ultraviolet wavelengths, visible wavelengths, or infrared wavelengths to obtain driving parameter versus light intensity data; and
comparing the obtained data with characterizing data previously derived for said layer of material in order to calibrate said driving parameter.

2. The method according to claim 1, wherein said comparing comprises aligning one or more features of the obtained data with one or more features of the characterizing data in order to calibrate the driving parameter.

3. The method according to claim 1, wherein the thickness of said layer of material is between 1 and 20 times the maximum wavelength of the operating wavelength range of the optical component.

4. The method according to claim 1, wherein said material is plastic.

5. The method according to claim 1, wherein collimating optics is disposed within the light path.

6. The method according to claim 1, wherein calibrating said driving parameter comprises creating a look-up table mapping the driving parameter to wavelength.

7. The method according to claim 1, wherein said optical component is a spectrometer.

8. The method according to claim 7, wherein said layer of material is interposed between the tunable light source and the spectrometer, the method comprising operating said spectrometer to vary said driving parameter while detecting light transmitted through said layer of material to obtain driving parameter versus light intensity data.

9. The method according to claim 8 further comprising disposing a reflector in the light path to reflect light from the tunable light source to the spectrometer via the layer of material.

10. The method according to claim 7 further comprising obtaining a system response by operating the spectrometer in the absence of the layer of material, and using that response to correct the detected light or calibration process.

11. The method according to claim 10, wherein said obtaining a system response comprises detecting light from said tunable light source or from a further light source.

12. A device comprising an optical component which is operable by a driving parameter across an operating wavelength range, the device comprising a layer of material that is movably disposable in an optical path and that is substantially planar and substantially transparent and has a thickness of the order of wavelengths in said range, and having a known transmission profile with a plurality of transmission maximums and a plurality of transmission minimums over at least a portion of the operation wavelength range of the component, the device being configured to:
 operate said optical component to vary said driving parameter while detecting light transmitted through said layer of material in the optical path provided by a tunable light source that produces light of ultraviolet wavelengths, visible wavelengths, or infrared wavelengths to obtain driving parameter versus light intensity data; and
 compare the obtained data with characterizing data previously derived for said layer of material in order to calibrate said driving parameter.

13. The device according to claim 12, wherein said optical component is a spectrometer.

14. The device according to claim 13, wherein said layer of material is slidably disposed in front of said spectrometer.

15. The device according to claim 13, further comprising tunable light source.

16. The device according to claim 14, further comprising a light reflector for re-directing light from said tunable light source to said spectrometer.

17. The method according to claim 1, wherein the thickness of said layer of material is between 1 and 10 times the maximum wavelength of the operating wavelength range of the optical component.

18. A device comprising:
 a tunable light source that produces light ranging from ultraviolet wavelengths to infrared wavelengths;
 an optical component which is operable by a driving parameter across an operating wavelength range;
 a layer of material that is movably disposable in an optical path of the tunable light source and the optical component and that is substantially planar and substantially transparent and has a thickness of the order of wavelengths in said range, and having a known transmission profile with a plurality of transmission maximums and a plurality of transmission minimums over at least a portion of the operation wavelength range of the component, wherein
 the optical component is varied by the driving parameter while detecting light transmitted through the layer of material in the optical path provided by the tunable light source that produces light of ultraviolet wavelengths, visible wavelengths, or infrared wavelengths to obtain driving parameter versus light intensity data and data that obtained by the optical component is compared with characterizing data previously derived for the layer of material in order to calibrate the driving parameter.

* * * * *